(12) United States Patent
Lee et al.

(10) Patent No.: US 11,075,796 B2
(45) Date of Patent: Jul. 27, 2021

(54) WIRELESS COMMUNICATION EQUIPMENT AND METHOD FOR CONFIGURING MESH NETWORK THEREOF

(71) Applicant: HUMAX NETWORKS, INC., Seongnam-si (KR)

(72) Inventors: Hun Il Lee, Suwon-si (KR); Nam Kyu Cho, Yongin-si (KR)

(73) Assignee: HUMAX NETWORKS, INC., Seongnam-si (KR)

( * ) Notice: Subject to any disclaimer, the term of this patent is extended or adjusted under 35 U.S.C. 154(b) by 0 days.

(21) Appl. No.: 16/279,207

(22) Filed: Feb. 19, 2019

(65) Prior Publication Data
US 2019/0334766 A1    Oct. 31, 2019

(30) Foreign Application Priority Data
Apr. 25, 2018    (KR) ........................ 10-2018-0047776

(51) Int. Cl.
| | |
|---|---|
| H04L 12/24 | (2006.01) |
| H04W 76/10 | (2018.01) |
| H04L 12/947 | (2013.01) |
| H04W 60/00 | (2009.01) |
| H04W 74/08 | (2009.01) |
| H04W 84/12 | (2009.01) |
| H04W 84/18 | (2009.01) |

(52) U.S. Cl.
CPC .......... *H04L 41/0803* (2013.01); *H04L 49/25* (2013.01); *H04W 60/00* (2013.01); *H04W 74/0808* (2013.01); *H04W 76/10* (2018.02); *H04W 84/12* (2013.01); *H04W 84/18* (2013.01)

(58) Field of Classification Search
CPC ........................ H04L 41/0803; H04W 76/10
See application file for complete search history.

(56) References Cited

U.S. PATENT DOCUMENTS

| | | | |
|---|---|---|---|
| 7,864,682 B2 * | 1/2011 | Appaji | H04L 12/66 370/235 |
| 8,102,814 B2 * | 1/2012 | Rahman | H04W 8/005 370/331 |

(Continued)

FOREIGN PATENT DOCUMENTS

| | | |
|---|---|---|
| KR | 10-1117829 B1 | 6/2005 |
| KR | 10-2009-0077593 A | 7/2009 |

(Continued)

OTHER PUBLICATIONS

The extended European search report dated Jul. 17, 2019.

*Primary Examiner* — Parth Patel (57) ABSTRACT

Wireless communication equipment includes a communication interface, a memory, and a processor electrically connected with the communication interface and the memory. The processor is configured to activate communication of the wireless communication equipment, to scan an external device for a network connection at a periphery of the wireless communication equipment, using the communication interface, to receive information including a mesh ID sent from the external device, using the communication interface, and to configure a mesh network with the external device by using the communication interface, when a designated string stored in the memory is included in the mesh ID.

14 Claims, 9 Drawing Sheets

(56) References Cited

U.S. PATENT DOCUMENTS

| | | | | |
|---|---|---|---|---|
| 8,116,336 B2* | 2/2012 | Jing | | H04L 29/1232 |
| | | | | 370/312 |
| 8,385,345 B2* | 2/2013 | Ji | | H04L 45/128 |
| | | | | 370/394 |
| 8,391,255 B2* | 3/2013 | Ribiere | | H04L 47/14 |
| | | | | 370/338 |
| 8,707,396 B2* | 4/2014 | Kim | | H04L 63/08 |
| | | | | 455/436 |
| 9,456,356 B2* | 9/2016 | Bradley | | H04W 24/02 |
| 9,910,976 B2* | 3/2018 | Williamson | | H04L 43/0882 |
| 10,397,189 B1* | 8/2019 | Hashmi | | H04L 63/164 |
| 10,530,858 B1* | 1/2020 | Parulkar | | G06F 16/178 |
| 2005/0068928 A1* | 3/2005 | Smith | | H04W 48/16 |
| | | | | 370/338 |
| 2006/0271703 A1* | 11/2006 | Kim | | H04W 48/08 |
| | | | | 709/239 |
| 2007/0011435 A1* | 1/2007 | Lee | | H04W 84/18 |
| | | | | 712/15 |
| 2007/0050523 A1* | 3/2007 | Emeott | | H04W 56/001 |
| | | | | 709/248 |
| 2009/0135716 A1* | 5/2009 | Veillette | | G01D 4/004 |
| | | | | 370/221 |
| 2009/0232003 A1* | 9/2009 | Vasseur | | H04L 12/4633 |
| | | | | 370/236.2 |
| 2009/0274083 A1* | 11/2009 | Wentink | | H04W 8/005 |
| | | | | 370/311 |
| 2010/0046468 A1* | 2/2010 | Oi | | H04W 84/20 |
| | | | | 370/331 |
| 2010/0131762 A1* | 5/2010 | Wu | | H04L 63/06 |
| | | | | 713/170 |
| 2010/0329270 A1* | 12/2010 | Asati | | H04L 45/00 |
| | | | | 370/401 |
| 2011/0066368 A1* | 3/2011 | Koyasu | | G01C 21/3679 |
| | | | | 701/533 |
| 2011/0159800 A1* | 6/2011 | Ueoka | | H04H 20/12 |
| | | | | 455/3.06 |
| 2012/0023265 A1* | 1/2012 | Liao | | G06F 13/387 |
| | | | | 710/5 |
| 2012/0158285 A1* | 6/2012 | Yamazaki | | G01C 21/3461 |
| | | | | 701/410 |
| 2012/0307685 A1* | 12/2012 | Kim | | H04W 48/16 |
| | | | | 370/255 |
| 2012/0320822 A1* | 12/2012 | Tamura | | H04W 88/06 |
| | | | | 370/315 |
| 2013/0003654 A1* | 1/2013 | Iyer | | H04W 84/22 |
| | | | | 370/328 |
| 2013/0089001 A1* | 4/2013 | Dattagupta | | H04W 48/20 |
| | | | | 370/255 |
| 2013/0109314 A1* | 5/2013 | Kneckt | | H04W 4/80 |
| | | | | 455/41.2 |
| 2013/0136033 A1* | 5/2013 | Patil | | H04L 41/145 |
| | | | | 370/255 |
| 2013/0188628 A1* | 7/2013 | Lee | | H04W 48/14 |
| | | | | 370/338 |
| 2014/0003286 A1* | 1/2014 | Estevez | | H04W 48/02 |
| | | | | 370/254 |
| 2014/0126558 A1* | 5/2014 | Kim | | H04W 74/04 |
| | | | | 370/336 |
| 2014/0355589 A1* | 12/2014 | Yang | | H04W 48/14 |
| | | | | 370/338 |
| 2015/0139072 A1* | 5/2015 | Hong | | H04W 72/0446 |
| | | | | 370/326 |
| 2015/0281952 A1* | 10/2015 | Patil | | H04W 12/04 |
| | | | | 713/168 |
| 2016/0028675 A1* | 1/2016 | Veillette | | H04L 51/14 |
| | | | | 370/312 |
| 2016/0191259 A1* | 6/2016 | Ben-Yehezkel | | H04L 12/189 |
| | | | | 370/312 |
| 2016/0192186 A1* | 6/2016 | Lin | | H04W 12/04 |
| | | | | 380/270 |
| 2016/0302079 A1* | 10/2016 | Chari | | H04W 16/26 |
| 2017/0238239 A1* | 8/2017 | Ong | | H04W 48/18 |
| | | | | 370/338 |
| 2018/0024805 A1* | 1/2018 | Nakagawa | | G06F 3/0482 |
| | | | | 709/203 |
| 2018/0027587 A1* | 1/2018 | Qiao | | H04L 5/0096 |
| | | | | 370/329 |
| 2018/0091382 A1* | 3/2018 | Dronadula | | H04L 41/5025 |
| 2018/0152976 A1* | 5/2018 | Baron | | H04W 48/16 |
| 2018/0213580 A1* | 7/2018 | Taskin | | H04L 12/2856 |
| 2018/0288684 A1* | 10/2018 | Ravuri | | H04W 48/16 |
| 2018/0324876 A1* | 11/2018 | Iwami | | H04W 84/12 |
| 2018/0331914 A1* | 11/2018 | Yoshida | | H04B 7/04 |
| 2018/0375846 A1* | 12/2018 | Heydon | | H04W 4/38 |
| 2019/0053133 A1* | 2/2019 | Abouelseoud | | H04W 8/005 |
| 2019/0069215 A1* | 2/2019 | Abouelseoud | | H04W 40/244 |
| 2019/0104422 A1* | 4/2019 | Chiang | | H04W 48/08 |
| 2019/0219294 A1* | 7/2019 | Dutt | | G05B 19/042 |
| 2019/0289539 A1* | 9/2019 | Lee | | H04W 40/246 |
| 2019/0327143 A1* | 10/2019 | Kim | | H04L 12/4625 |
| 2020/0107342 A1* | 4/2020 | Kuang | | H04W 80/02 |
| 2020/0127896 A1* | 4/2020 | Davito | | H04L 41/0886 |

FOREIGN PATENT DOCUMENTS

| | | |
|---|---|---|
| KR | 10-1731844 B1 | 11/2011 |
| KR | 10-2013-0012869 A | 2/2013 |
| KR | 10-1814810 B1 | 2/2013 |
| KR | 10-1680675 BI | 8/2015 |
| KR | 10-1720710 B1 | 3/2017 |
| KR | 10-2017-0045507 A | 4/2017 |
| KR | 10-2017-0123563 A | 11/2017 |

* cited by examiner

WIRELESS COMMUNICATION EQUIPMENT AND METHOD FOR CONFIGURING MESH NETWORK THEREOF

CROSS-REFERENCE TO RELATED APPLICATION

This application claims the benefit of priority under 35 U.S.C 119(a) to Korean Patent Application No. 10-2018-0047776, filed in the Korean Intellectual Property Office on Apr. 25, 2018, the entire contents of which are incorporated herein by reference.

TECHNICAL FIELD

Embodiments of the present disclosure relate to a technology for configuring a mesh network using wireless communication equipment.

A wireless network allows a user to access various pieces of content conveniently through user equipment such as a personal computer (PC), a smartphone, and a tablet PC. Various pieces of 20 wireless communication equipment such as a router, an access point (AP), an extender (e.g., a repeater), and the like may be used to establish a wireless network. In recent years, there have been an increasing number of users who utilize pieces of wireless communication equipment to utilize a wireless network without the limitation of an indoor location. Wireless communication equipment may configure a mesh network according to IEEE 802.11s capable of freely changing the connection relationship between pieces of wireless communication equipment.

Since the connection method through existing Wi-Fi protected setup (WPS), a wire, or a web user interface (UI) may only support one-to-one connection between AP and AP, the connection method may not establish multiple network environments. In the meantime, in the case of using an IEEE 802.11s-based mesh network, a user may perform a complex process such as the setting of an ID and a password for the purpose of configuring the mesh network.

SUMMARY

Embodiments of the present disclosure have been made to solve the above-mentioned problems occurring in the prior art while advantages achieved by the prior art are maintained intact.

An aspect of the present disclosure provides wireless communication equipment that configures multiple network environments using a connection method the same as the conventional connection method and automatically configures a mesh network without separate settings, by adding IEEE 802.11s-based mesh to the connection method through WPS, wire, or a web UI.

The technical problems to be solved by embodiments of the present disclosure are not limited to the aforementioned problems, and any other technical problems not mentioned herein will be clearly understood from the following description by those skilled in the art to which the present disclosure pertains.

According to an aspect of the present disclosure, wireless communication equipment may include a communication interface, a memory, and a processor electrically connected with the communication interface and the memory. The processor may be configured to activate communication of the wireless communication equipment, to scan an external device for a network connection at a periphery of the wireless communication equipment, using the communication interface, to receive information including a mesh ID sent from the external device, using the communication interface, and to configure a mesh network with the external device by using the communication interface, when a designated string stored in the memory is included in the mesh ID.

According to an embodiment, the wireless communication equipment may further include a switch configured to receive an input of a user. When the input is applied to the switch, the processor may be configured to activate the communication and to scan the external device.

According to an embodiment, the processor may be configured to scan the external device, when a command is received from user equipment connected to the wireless communication equipment.

According to an embodiment, the processor may be configured to scan the external device by sensing a wireless communication signal sent from the external device.

According to an embodiment, the wireless communication signal may be a probe response.

According to an embodiment, the external device may be a router or an access point (AP).

According to an embodiment, the processor may be configured to receive a probe response including the mesh ID sent from the external device.

According to an embodiment, the processor may be configured to receive information including the mesh ID sent from a plurality of external devices, to provide user equipment connected to the wireless communication equipment with a list of one or more external devices, in each of which the designated string is included in the mesh ID, from among the plurality of external devices, and to configure the mesh network with an external device, which is selected by a user, from among the one or more external devices included in the list, in the user equipment.

According to an embodiment, the processor may be configured to configure a mesh connection depending on Wi-Fi protected setup (WPS) registration protocol.

According to an embodiment, the processor may be configured to store the mesh ID and a mesh pre-shared key (PSK) of the external device in the memory and to perform rebooting of the wireless communication equipment.

According to an embodiment, the processor may be configured to configure the mesh network by sending or receiving data to or from the external device, after performing the rebooting.

According to another aspect of the present disclosure, a method for configuring a mesh network of wireless communication equipment may include activating communication of the wireless communication equipment, scanning an external device for a network connection at a periphery of the wireless communication equipment, receiving information including a mesh ID sent from the external device, and configuring a mesh network with the external device, when a designated string is included in the mesh ID.

According to an embodiment, the scanning may include scanning the external device by sensing a wireless communication signal sent from the external device.

According to an embodiment, the wireless communication signal may be a probe response.

According to an embodiment, the receiving may include receiving a probe response including the mesh ID sent from the external device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, various embodiments of the present disclosure will be described with reference to accompanying drawings. However, it should be understood that the present disclosure is not intended to be limited to a specific embodiment, but intended to include various modifications, equivalents, and/or alternatives of the corresponding embodiment.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When a (e.g., first) component is referred to as being "(operatively or communicatively) coupled with/to" or "connected to" another (e.g., second) component, it may be directly coupled with/to or connected to the other component or an intervening component (e.g., a third component) may be present. The size and thickness of each of the components illustrated in the drawings are shown for convenience of explanation and the present disclosure is not necessarily limited to the size and thickness of the configuration in which the present disclosure is illustrated.

Hereinafter, wireless communication equipment according to various embodiments will be described with reference to the accompanying drawings.

Figure 1:
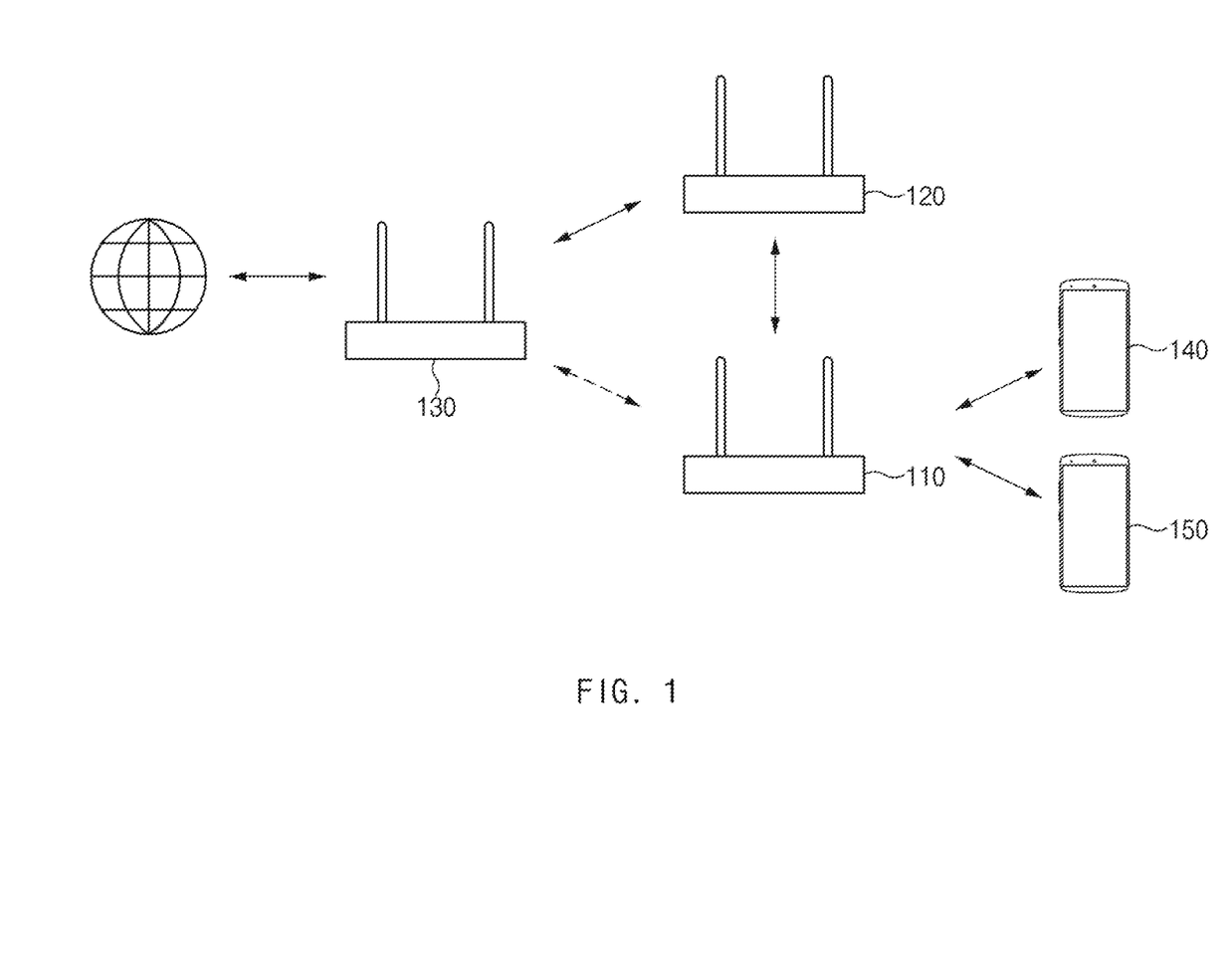
FIG. 1 illustrates an operation environment of wireless communication equipment, according to an embodiment.

FIG. 1 illustrates an operation environment of wireless communication equipment, according to an embodiment.

Referring to FIG. 1, wireless communication equipment 110 according to an embodiment may be connected to a first external device 120 and pieces of user equipment 140 and 150. Each of the wireless communication equipment 110 and the first external device 120 may be an extender (e.g., a repeater, a wireless bridge, an AP, or the like). A second external device 130 may be a router. The second external device 130 may operate as a master; each of the wireless communication equipment 110 and the first external device 120 may operate as a slave. The wireless communication equipment 110 may be connected to the second external device 130 through the first external device 120, when a mesh network is configured. Furthermore, the connection relationship between the wireless communication equipment 110, the first external device 120, and the second external device 130 may be changed freely. For example, the wireless communication equipment 110 may be connected to the second external device 130 through the first external device 120. For another example, the wireless communication equipment 110 may be directly connected to the second external device 130; the first external device 120 may be connected to the second external device 130 through the wireless communication equipment 110. The pieces of user equipment 140 and 150 may be connected to a wireless network through the wireless communication equipment 110. The wireless communication equipment 110 according to an embodiment may automatically configure the mesh network by using the mesh ID of the first external device 120 or the second external device 130. Hereinafter, an operation of configuring the mesh network will be described in detail.

Figure 2:
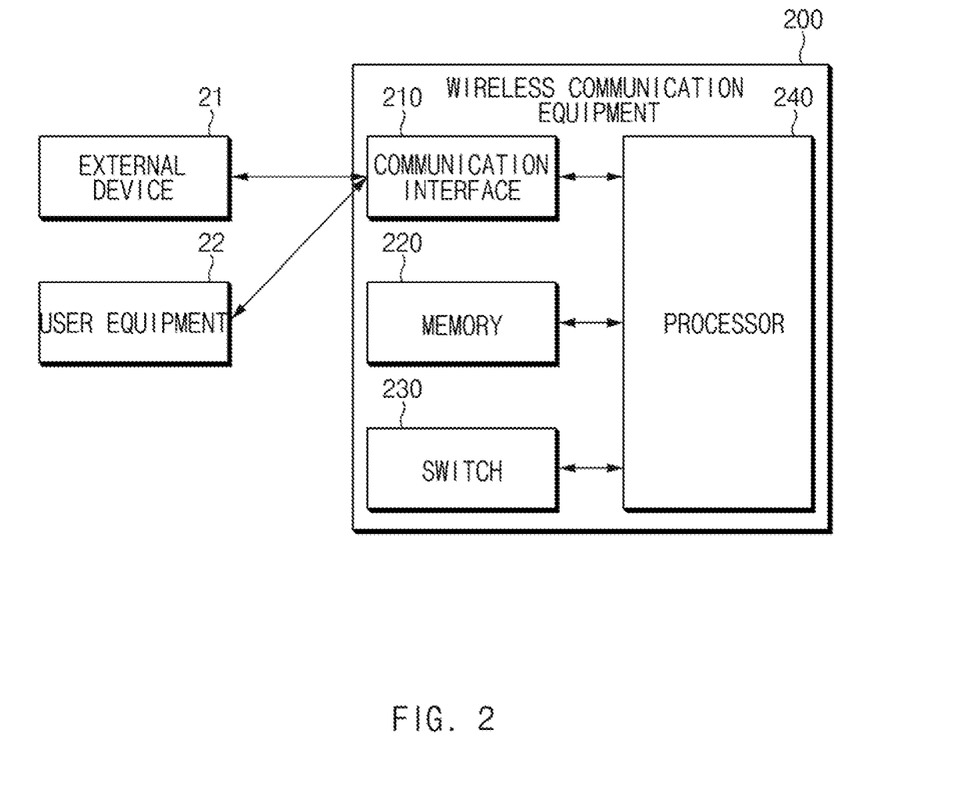
FIG. 2 is a block diagram illustrating a configuration of wireless communication equipment, according to an embodiment.

FIG. 2 is a block diagram illustrating a configuration of wireless communication equipment, according to an embodiment.

Referring to FIG. 2, wireless communication equipment 200 according to an embodiment may include a communication interface 210, a memory 220, a switch 230, and a processor 240. For example, the wireless communication equipment 200 may be an extender such as a repeater, a wireless bridge, an AP, or the like.

The communication interface 210 may include a wired/wireless interface. The communication interface 210 may be connected to an external device 21 (e.g., a router or an AP) and user equipment 22.

The memory 220 may include a volatile and/or nonvolatile memory. The memory 220 may store a command or data associated with another component of the wireless communication equipment 200. The memory 220 may store software and a program. The memory 220 may store a string for comparison with a mesh ID.

The switch 230 may be configured to receive a user input. For example, the switch 230 may be a WPS connection button.

The processor 240 may be electrically connected to the communication interface 210, the memory 220, and the switch 230. The processor 240 may control the components such as the communication interface 210, the memory 220, the switch 230, and the like and may perform various data processing and calculation.

According to an embodiment, the processor 240 may activate the communication of the wireless communication equipment 200. For example, the processor 240 may operate a WPS Daemon and may activate communication, when an input is applied to the switch 230 of the wireless communication equipment 200 and the switch of the external device 21. The processor 240 may activate communication through a variety of other methods.

According to an embodiment, the processor 240 may scan the external device 21 for a network connection at a periphery of the wireless communication equipment 200, by using the communication interface 210. For example, the processor 240 may scan the external device 21 that starts a WPS connection, when the communication is activated by the input to the switch 230. For another example, the processor 240 may scan the external device 21 by site survey, when a command is received from the user equipment 22, which is connected to the wireless communication equipment 200, through a web UI. The processor 240 may scan the external device 21 by sensing a wireless communication signal sent from the external device 21. For example, the wireless communication signal may be a probe response corresponding to a probe request. The external device 21 may send the probe response including a mesh ID.

According to an embodiment, the processor 240 may receive information including the mesh ID sent from the external device 21 by using the communication interface 210. The processor 240 may receive the probe response including the mesh ID sent from the external device 21. For example, the processor 240 may verify a router including WPS information, based on the scan result and may determine whether the mesh ID is present in the probe response received from the verified router.

According to an embodiment, the processor 240 may configure the mesh network with the external device 21 by using the communication interface 210, when the designated string is included in the mesh ID. The processor 240 may use the mesh ID, when the processor 240 configures the mesh network. The processor 240 may automatically configure the mesh network with the external device 21 having the mesh ID including the designated string. The method of configuring the mesh network may vary depending on a manufacturer. Accordingly, the manufacturer may set the mesh ID of a product so as to include the designated string. The wireless communication equipment 200 may determine whether the external device 21 is manufactured by a manufacturer the same as the wireless communication equipment 200, by using the mesh ID; the wireless communication equipment 200 may automatically configure the mesh network depending on the connection process set by the manufacturer in advance, when the external device 21 is manufactured by the same manufacturer.

According to an embodiment, the processor 240 may configure the mesh connection depending on the WPS registration protocol. For example, the processor 240 may configure the mesh connection depending on M1 to M8 that are the WPS registration protocol. The processor 240 may perform a connection operation of M1 to M7 steps illustrated in FIG. 8. The processor 240 may store the mesh ID and the mesh pre-shared key (PSK) of the external device 21 in the memory 220 and may reboot the wireless communication equipment 200. After rebooting, the processor 240 may perform M8 step. The processor 240 may send and/or receive data to and/or from the external device 21 to configure a mesh network, when M8 step is performed. The processor 240 may receive wireless information (e.g., service set identifier (SSID), security, and the like) of the external device 21, may set the wireless communication equipment 200 based on the wireless information of the external device 21, and may reboot, by synchronizing with the external device 21, when the mesh network is configured successfully.

According to an embodiment, the processor 240 may receive information including the mesh ID sent from the plurality of external devices 21. The processor 240 may provide the user equipment 22 connected to the wireless communication equipment 200 with the list of the one or more external devices 21, in each of which the designated string is included in the mesh ID, from among a plurality of external devices 21. The processor 240 may configure a mesh network with the external device 21, which is selected by a user, from among the one or more external devices 21 included in the list, in the user equipment 22.

As described above, users who lack knowledge of network equipment may easily configure a mesh network environment by automatically configuring the mesh network without a user input or the user's manipulation, when the designated string is included in the mesh ID.

Figure 3:
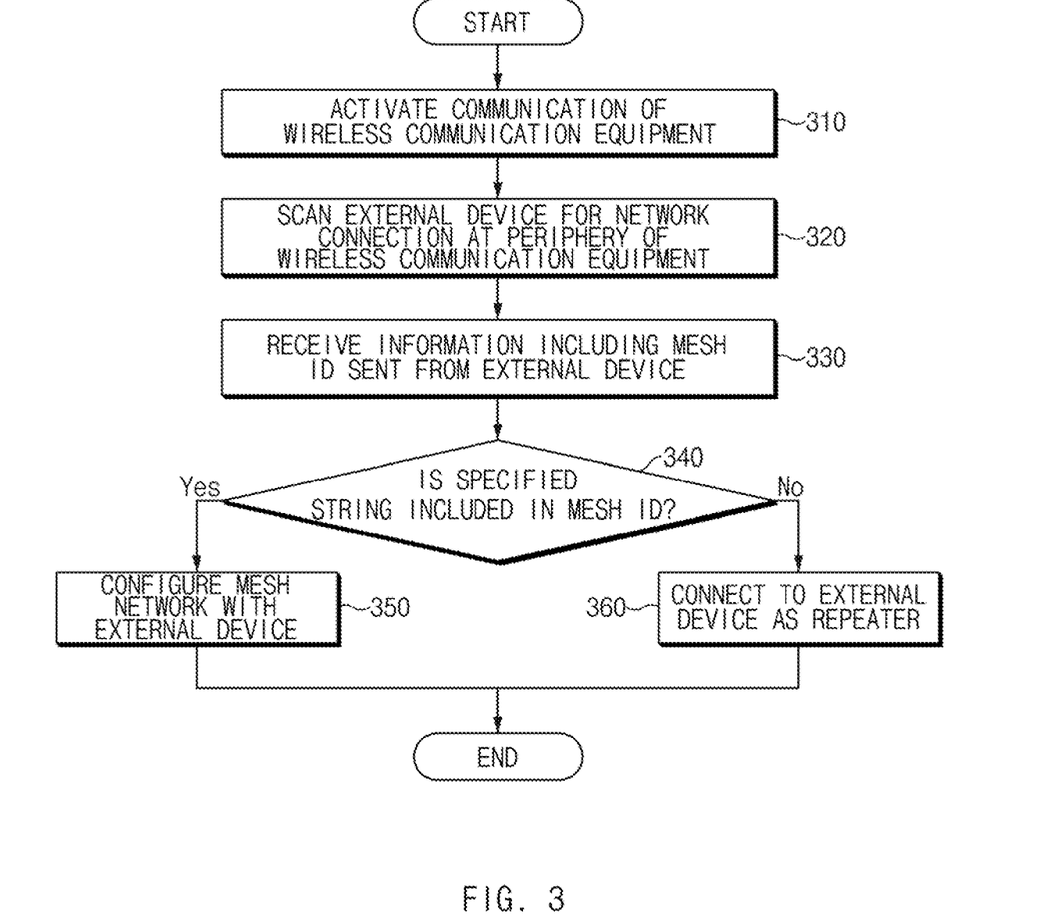
FIG. 3 is a flowchart for describing a mesh network configuring method of wireless communication equipment, according to an embodiment.

FIG. 3 is a flowchart for describing a mesh network configuring method of wireless communication equipment, according to an embodiment.

Hereinafter, it is assumed that the wireless communication equipment 200 of FIG. 2 performs the process of FIG. 3. In addition, as described in FIG. 3, it is understood that the operation described as being executed by the wireless communication equipment 200 is controlled by the processor 240 of the wireless communication equipment 200.

In operation 310, wireless communication equipment may activate the communication of the wireless communication equipment. For example, the wireless communication equipment may activate the communication, when an input is applied to a WPS switch.

In operation 320, the wireless communication equipment may scan an external device for a network connection at a periphery of the wireless communication equipment. For example, the wireless communication equipment may sense a signal sent from the external device.

In operation 330, the wireless communication equipment may receive information including the mesh ID sent from the external device. For example, the wireless communication equipment may receive a probe response including the mesh ID from the external device.

In operation 340, the wireless communication equipment may determine whether the designated string is included in the mesh ID. For example, the wireless communication equipment may determine whether the predetermined string is included in the mesh ID of the external device by a manufacturer.

In operation 350, the wireless communication equipment may configure the mesh network with the external device, when the designated string is included in the mesh ID. For example, the wireless communication equipment may automatically configure the mesh network with the external device having the mesh ID including the designated string, depending on the predetermined connection process.

In operation 360, the wireless communication equipment may be connected to the external device as a repeater, when the designated string is not included in the mesh ID. For example, since it is impossible to automatically configure the mesh network depending on the predetermined connection process when the manufacturer of the external device is different from that of the wireless communication equipment, the wireless communication equipment may be connected to the external device as a repeater.

Figure 4:
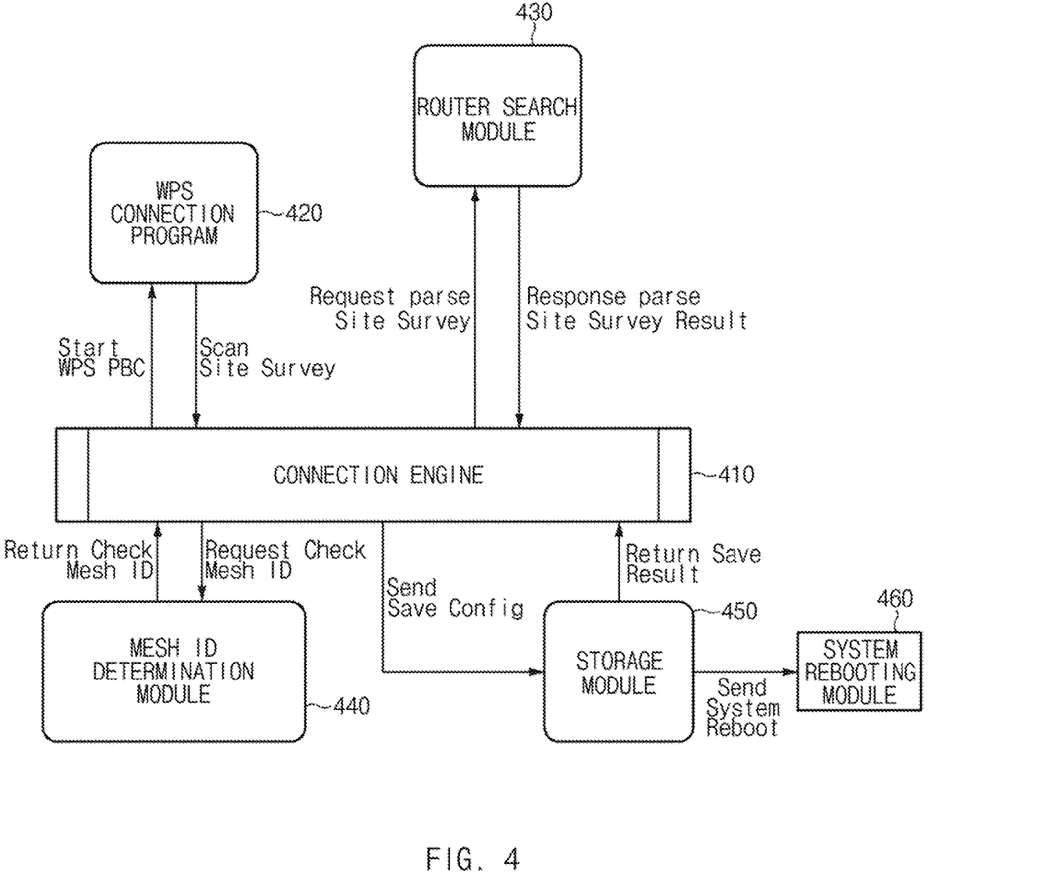
FIG. 4 is a block diagram illustrating a program module included in wireless communication equipment, according to an embodiment.

FIG. 4 is a block diagram illustrating a program module included in wireless communication equipment, according to an embodiment.

Referring to FIG. 4, a program module may include a connection engine 410, a WPS connection program 420, a router search module 430, a mesh ID determination module 440, a storage module 450, and a system rebooting module 460.

The connection engine 410 may configure the mesh connection by utilizing a connection method using WPS push button configuration (PBC). The connection engine 410 may start the WPS PBC. The WPS connection program 420 may perform a site survey. The connection engine 410 may scan the site survey. The connection engine 410 may request the router search module 430 to parse the site survey and may receive a response from the router search module 430. The connection engine 410 may request the mesh ID determination module 440 to check the mesh ID. The mesh ID determination module 440 may check whether the designated string is included in the mesh ID of a router that is a WPS connection target. The mesh ID determination module 440 may return the check result to the connection engine 410. The connection engine 410 may send information about the router to the storage module 450. The storage module 450 may store the information about the router and may return the storage result to the connection engine 410. The connection engine 410 may configure the mesh connection. The system rebooting module 460 may reboot a system, when the mesh connection is configured.

Figure 5:
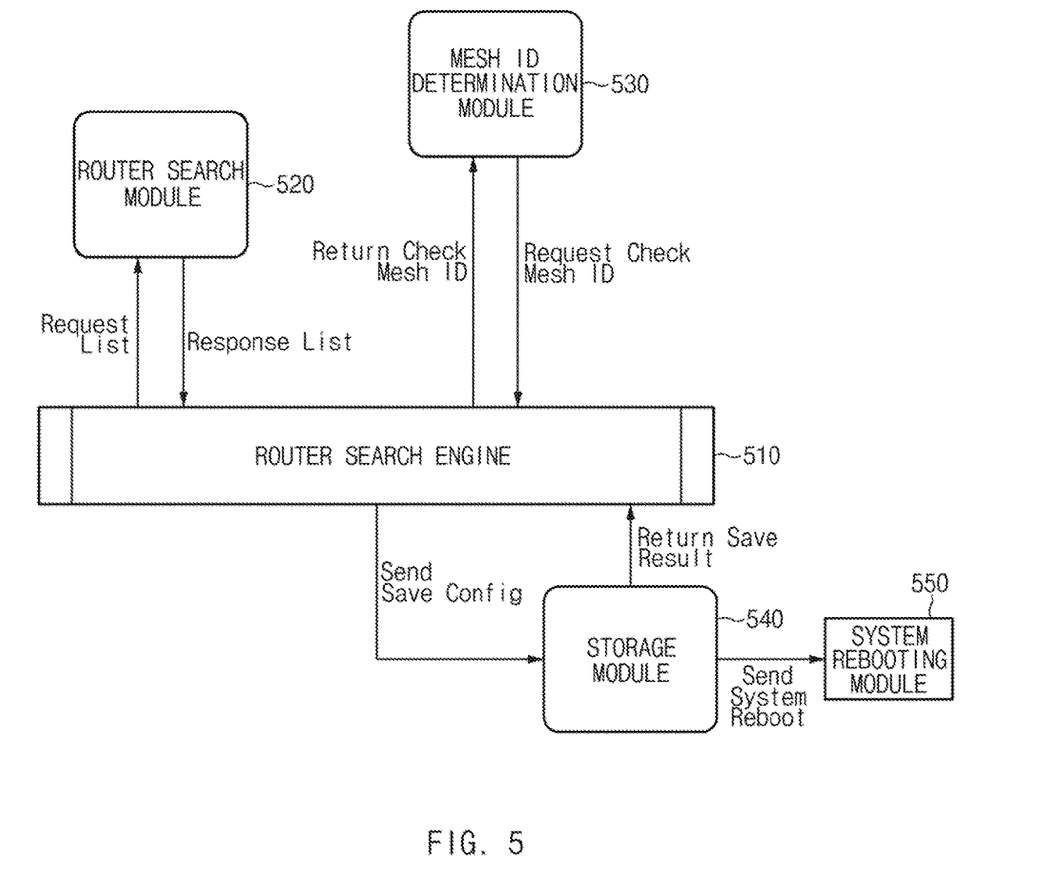
FIG. 5 is a block diagram illustrating a program module included in wireless communication equipment, according to an embodiment.

FIG. 5 is a block diagram illustrating a program module included in wireless communication equipment, according to an embodiment.

Referring to FIG. 5, a program module may include a router search engine 510, a router search module 520, a mesh ID determination module 530, a storage module 540, and a system rebooting module 550.

User equipment may access a web UI. The user equipment may start settings in response to a user input to a web UI. The router search engine 510 may search for neighboring routers and may configure a connection, when the connection is requested through a web UI. The router search engine 510 may make a request for a list of neighboring routers to the router search module 520 and may receive the list from the router search module 520. The router search engine 510 may request the mesh ID determination module 530 to parse the mesh ID. The mesh ID determination module 530 may check whether the designated string is included in the mesh ID of each of the routers included in the list. The mesh ID determination module 530 may return the check result to the router search engine 510. The user equipment may output a cover for identifying a router having the mesh ID including the designated string in the list. The router search engine 510 may send information about the selected router to the storage module 540, when the router having the mesh ID including the designated string is selected by a user in the user equipment. The storage module 540 may store information about the router and may return the storage result to the router search engine 510. The router search engine 510 may configure a mesh connection to the selected router. The system rebooting module 550 may reboot a system, when the mesh connection is configured.

Figure 6:
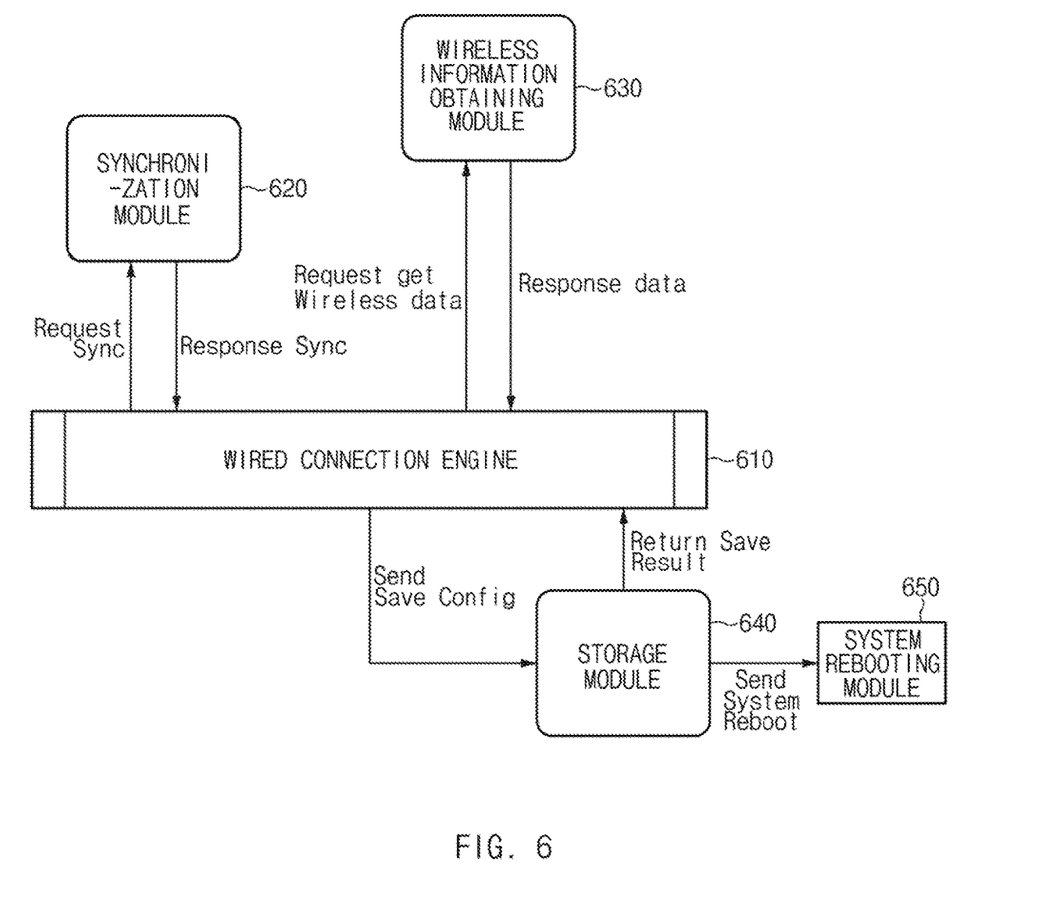
FIG. 6 is a block diagram illustrating a program module included in wireless communication equipment, according to an embodiment.

FIG. 6 is a block diagram illustrating a program module included in wireless communication equipment, according to an embodiment.

Referring to FIG. 6, a program module may include a wired connection engine 610, a synchronization module 620, a wireless information obtaining module 630, a storage module 640, and a system rebooting module 650.

A user may connect a WAN port of an extender to a LAN port of a router by wire and may turn on the power of the extender. The IP address of the extender may be by wire allocated through the WAN port. The wired connection engine 610 may perform a data synchronization operation. The wired connection engine 610 may request the synchronization module 620 to synchronize with the connected router and may receive a response to the request from the synchronization module 620. The wired connection engine 610 may request the wireless information obtaining module 630 to obtain the wireless information of the connected router. The wireless information obtaining module 630 may obtain the wireless information of the router by communicating with the router. The wired connection engine 610 may receive the wireless information of the router from the wireless information obtaining module 630. The wired connection engine 610 may send the received wireless information to the storage module 640. The storage module 640 may store the wireless information and may return the storage result to the wired connection engine 610. The system rebooting module 650 may reboot a system, when the setting of the extender is completed by using the wireless information.

Figure 7:
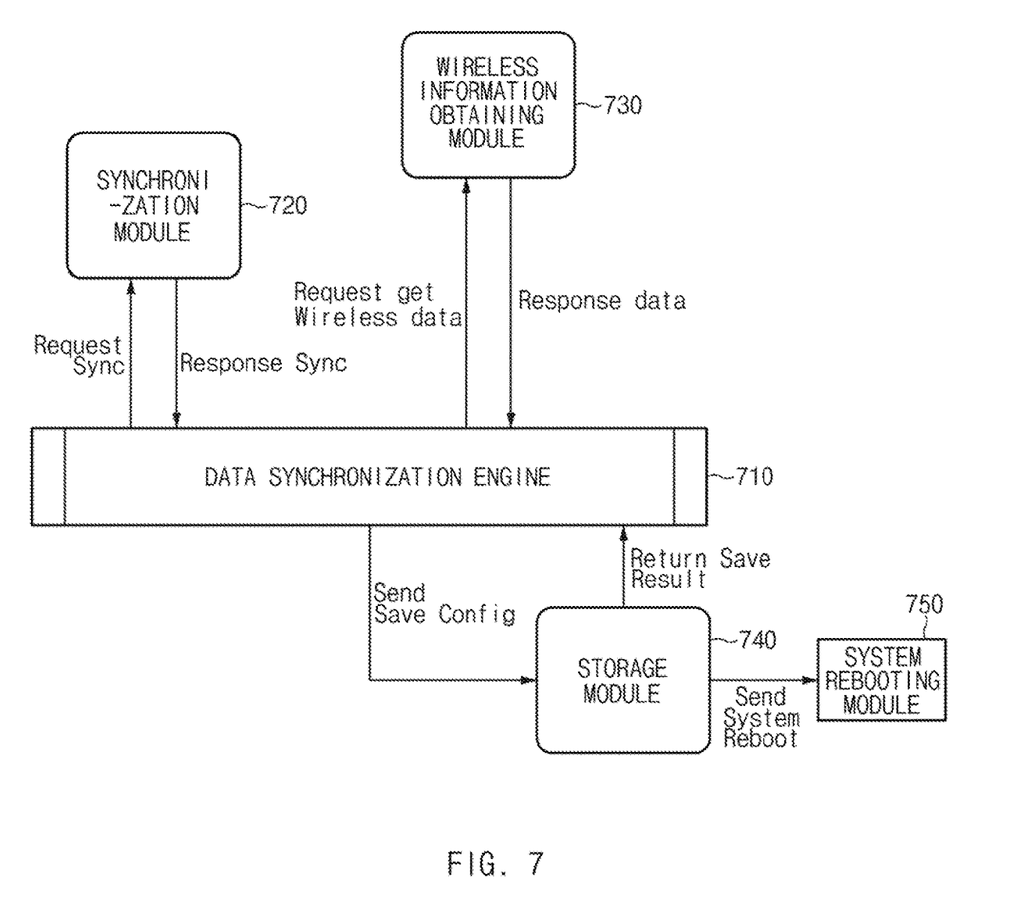
FIG. 7 is a block diagram illustrating a program module included in wireless communication equipment, according to an embodiment.

FIG. 7 is a block diagram illustrating a program module included in wireless communication equipment, according to an embodiment.

Referring to FIG. 7, a program module may include a data synchronization engine 710, a synchronization module 720, a wireless information obtaining module 730, a storage module 740, and a system rebooting module 750.

An extender may configure a mesh connection and a roaming connection, when the extender is connected to a router. For the purpose of using wireless settings the same as the wireless settings of the router, the extender may perform data synchronization, when the configuration of each of the mesh connection and the roaming connection is completed. The data synchronization engine 710 may make a request for synchronization to the synchronization module 720 and may receive a response to the request from the synchronization module 720. The data synchronization engine 710 may request the wireless information obtaining module 730 to obtain the wireless information of the router. The wireless information obtaining module 730 may obtain the wireless information of the router by communicating with the router. The wireless information may include, for example, Wireless Enable/Disable, Wireless SSID, Wireless Encrypt, Wireless Channel Number, Mesh Enable/Disable, Mesh ID, Mesh Encrypt, and the like. The data synchronization engine 710 may receive the wireless information of the router from the wireless information obtaining module 730. The data synchronization engine 710 may send the received wireless information to the storage module 740. The storage module 740 may store the wireless information and may return the storage result to the data synchronization engine 710. The data synchronization engine 710 may apply the wireless information to a system. The system rebooting module 750 may reboot the system, when the application of the wireless information is completed.

Figure 8:
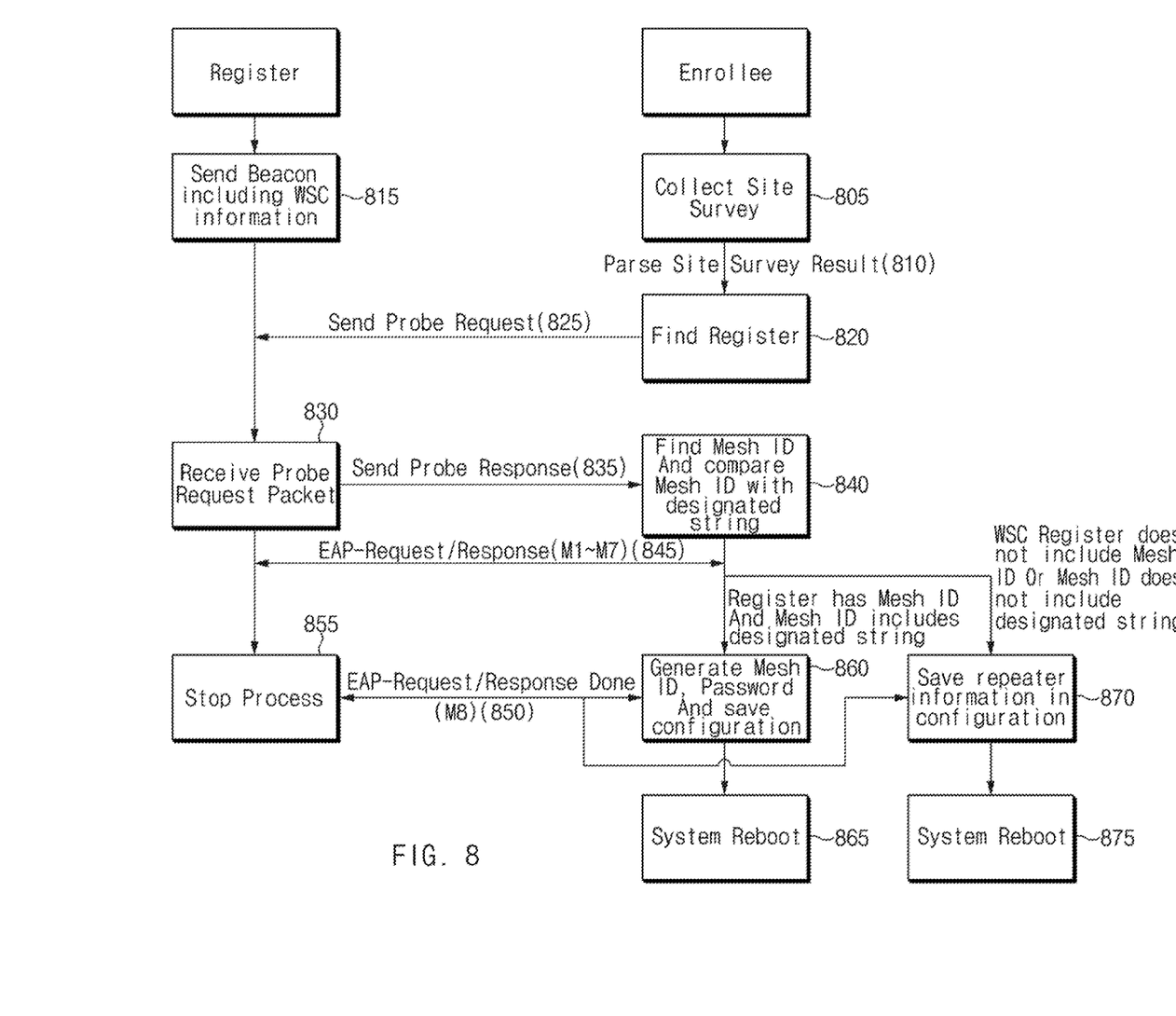
FIG. 8 is a flowchart for describing a mesh network configuring method of wireless communication equipment, according to an embodiment.

FIG. 8 is a flowchart for describing a mesh network configuring method of wireless communication equipment, according to an embodiment.

Referring to FIG. 8, a register and an enrollee may perform a process for a mesh connection. The register may be included in, for example, a router; the enrollee may be included in, for example, an extender. The register and the enrollee may start a connection process, when an input is applied to each WPS button.

In operation 805, the enrollee may collect a site survey, when the connection process is started. In operation 810, the enrollee may parse the site survey result. In operation 815, the register may send a beacon including Wi-Fi simple configuration (WSC) information when the connection process is started. In operation 820, the enrollee may find a register by using the sent beacon. In operation 825, the enrollee may send a probe request to the found register. In operation 830, the register may receive a probe request packet from the enrollee. In operation 835, the register may send a probe response including the mesh ID to the enrollee. In operation 840, the enrollee may find the mesh ID in the probe response and may compare a designated string with the mesh ID. In operation 845, the register and the enrollee may perform extensible authentication protocol (EAP) request and response (M1 to M7).

The enrollee may determine whether the register has the mesh ID and whether the mesh ID includes the designated string. The enrollee may configure the mesh network, when the register has the mesh ID and the mesh ID includes the designated string. In operation 850, the register and the enrollee may complete the EAP request and response (M8). In operation 855, the register may stop the process. In operation 860, the enrollee may generate a mesh ID and a password and may store configuration, when the register has the mesh ID and the mesh ID includes the designated string. In operation 865, the enrollee may reboot a system.

The enrollee may configure a network as a repeater, when the register does not include the mesh ID or the mesh ID does not include the designated string. In operation 870, the enrollee may store repeater information in configuration. In operation 875, the enrollee may reboot the system.

Figure 9:
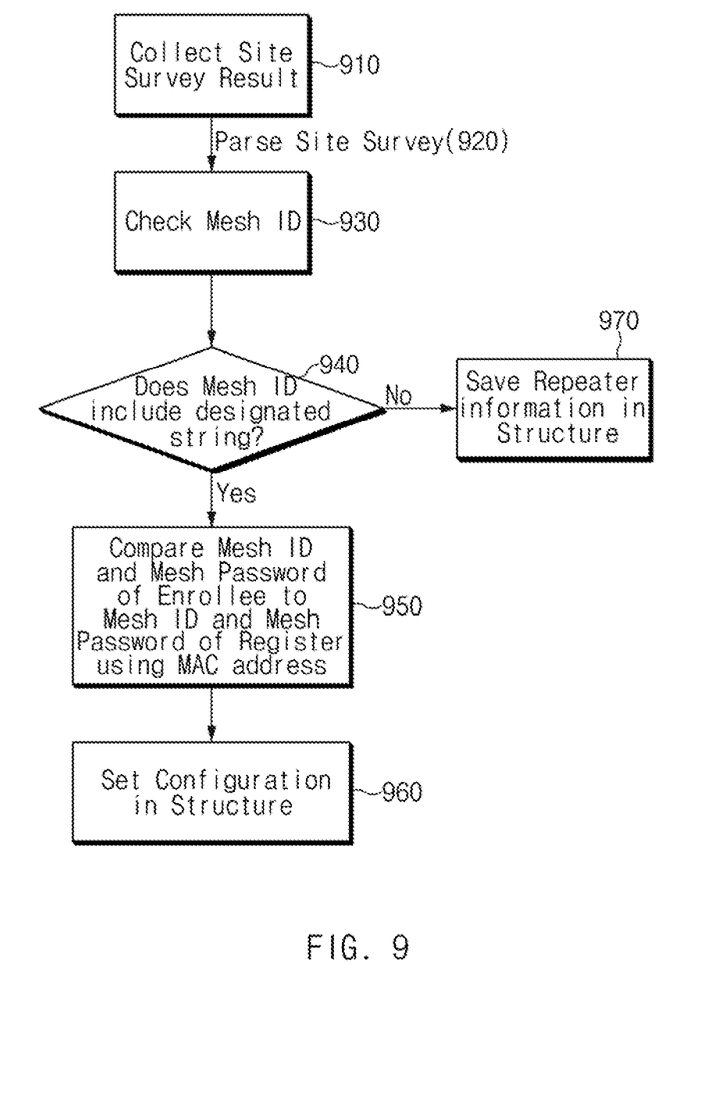
FIG. 9 is a flowchart for describing a mesh network configuring method of wireless communication equipment, according to an embodiment.

FIG. 9 is a flowchart for describing a method for configuring a mesh network of wireless communication equipment, according to an embodiment.

The process illustrated in FIG. 9 may be a part of the process illustrated in FIG. 8; in the process illustrated in FIG. 9, the operation of an enrollee associated with a mesh connection or a repeater connection may be described in detail.

Referring to FIG. 9, in operation 910, the enrollee may collect a site survey result. In operation 920, the enrollee may parse a site survey. In operation 930, the enrollee may check the mesh ID of the register received from the register. In operation 940, the enrollee may determine whether the mesh ID includes a designated string.

The enrollee may perform operation 950 and operation 960 for the mesh connection, when the mesh ID includes the designated string. In operation 950, the enrollee may compare the mesh ID and the mesh password of the enrollee to the mesh ID and the mesh password of the register, by using the MAC address of the register.

In operation 960, the enrollee may set configuration in a structure.

The enrollee may perform operation 970 for the repeater connection, when the mesh ID does not include the designated string. In operation 970, the enrollee may store repeater information in the structure.

In the present disclosure, each block or each step may represent a part of a module, segment, or code that includes one or more executable instructions for executing a specified logical function. In addition, it should also be noted that in some alternative embodiments, the functions described in blocks or steps occur out of order. For example, two consecutive blocks or steps may, in fact, be performed substantially and concurrently, or the blocks or steps may sometimes be performed in reverse order depending on the corresponding function.

The step of the methods or algorithms described in connection with the embodiments disclosed in the specification may be directly implemented with a hardware module, a software module, or a combination of the hardware module and the software module, which is executed by a processor. The software module may reside in a random access memory (RAM), a flash memory, a read only memory (ROM), an erasable and programmable ROM (EPROM), an electrically EPROM (EEPROM), a register, a hard disk drive (HDD), a removable disc, a compact disc-ROM (CD-ROM), or any other form of storage medium known in the art. The exemplary storage medium may be coupled to the processor. The processor may read out information from the storage medium and may write information in the storage medium. Alternatively, the storage medium may be integrated with the processor. The processor and storage medium may reside in an application specific integrated circuit (ASIC). The ASIC may reside in a user terminal. Alternatively, the processor and storage medium may reside as a separate component in the user terminal.

The embodiments of the present disclosure have been described in detail with reference to the accompanying drawings. However, the present disclosure may not be necessarily limited to these embodiments and may be changed variously without departing from the technical spirit of the present disclosure. Therefore, embodiments of the present disclosure are not intended to limit the technical spirit of the present disclosure, but provided only for the illustrative purpose. Therefore, it should be understood that the above embodiments are not limiting, but illustrative. The scope of protection of the present disclosure should be construed by the attached claims, and all equivalents thereof should be construed as being included within the scope of the present disclosure.

According to an embodiment of the present disclosure, it is possible to provide wireless communication equipment in which a user lacking knowledge of network equipment is capable of establishing multiple network environments, by automatically configuring a mesh network when a designated string is included in a mesh ID sent from an external device.

Besides, a variety of effects directly or indirectly understood through this disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. Wireless communication equipment comprising:
a communication interface;
a memory; and
a processor electrically connected with the communication interface and the memory,
wherein the processor is configured to:
activate communication of the wireless communication equipment;
scan an external device for a network connection at a periphery of the wireless communication equipment, using the communication interface;

receive a beacon including Wi-Fi simple configuration information from the external device;
find the external device by using the beacon;
send a probe request packet to the found external device;
receive a probe response including a mesh ID sent from the found external device, using the communication interface; and
when the external device has the mesh ID, the mesh ID includes a designated string, and the external device is manufactured by the same manufacturer of the wireless communication equipment,
  generate a mesh ID and a mesh password and store configuration,
  compare the mesh ID and the mesh password of the wireless communication equipment and the mesh ID and a mesh password of the external device by using MAC address of the external device, and
  configure a mesh network with the external device by using the communication interface automatically depending on a connection process set by a manufacturer in advance;
when the external device does not have the mesh ID or the designated string is not included in the mesh ID, connect to the external device as an extender,
when the manufacturer of the external device is different from that of the wireless communication equipment, connect the external device as a repeater,
wherein the designated string includes information about a manufacturer set by the manufacturer of the external device.

2. The wireless communication equipment of claim 1, further comprising:
a switch configured to receive an input of a user,
wherein the processor is configured to:
when the input is applied to the switch,
activate the communication; and
scan the external device.

3. The wireless communication equipment of claim 1, wherein the processor is configured to:
scan the external device by sensing a wireless communication signal sent from the external device.

4. The wireless communication equipment of claim 1, wherein the external device is a router or an access point (AP).

5. The wireless communication equipment of claim 1, wherein the processor is configured to:
store repeater information in configuration and perform rebooting of the wireless communication equipment.

6. The wireless communication equipment of claim 1, wherein the processor is configured to:
receive information including the mesh ID sent from a plurality of external devices;
provide user equipment connected to the wireless communication equipment with a list of one or more external devices, in each of which the designated string is included in the mesh ID, from among the plurality of external devices; and
configure the mesh network with an external device, which is selected by a user, from among the one or more external devices included in the list, in the user equipment.

7. The wireless communication equipment of claim 1, wherein the processor is configured to:
configure a mesh connection depending on Wi-Fi protected setup (WPS) registration protocol.

8. The wireless communication equipment of claim 1, wherein the processor is configured to:
store the mesh ID and a mesh pre-shared key (PSK) of the external device in the memory; and
perform rebooting of the wireless communication equipment.

9. The wireless communication equipment of claim 8, wherein the processor is configured to:
after performing the rebooting,
configure the mesh network by sending or receiving data to or from the external device.

10. The wireless communication equipment of claim 1, wherein the processor scans the external device that starts a Wi-Fi protected setup (WPS) connection, when the communication is activated by the input to the switch.

11. A mesh network configuring method of wireless communication equipment, the method comprising:
activating communication of the wireless communication equipment;
scanning an external device for a network connection at a periphery of the wireless communication equipment;
receiving a beacon including Wi-Fi simple configuration information from the external device;
finding the external device by using the beacon;
sending a probe request packet to the found external device;
receiving a probe response including a mesh ID sent from the external device; and
when the external device has the mesh ID, the mesh ID includes a designated string, and the external device is manufactured by the same manufacturer of the wireless communication equipment,
  generate a mesh ID and a mesh password and store configuration,
  compare the mesh ID and the mesh password of the wireless communication equipment and the mesh ID and a mesh password of the external device by using MAC address of the external device, and configuring a mesh network with the external device automatically depending on a connection process set by a manufacturer in advance;
when the external device does not have the mesh ID or the designated string is not included in the mesh ID, connecting to the external device as an extender,
when the manufacturer of the external device is different from that of the wireless communication equipment, connect the external device as a repeater,
wherein the designated string includes information about a manufacturer set by the manufacturer of the external device.

12. The method of claim 11, further comprising:
receiving information including the mesh ID sent from a plurality of external devices;
providing user equipment connected to the wireless communication equipment with a list of one or more external devices, in each of which the designated string is included in the mesh ID, from among the plurality of external devices; and
configuring the mesh network with an external device, which is selected by a user, from among the one or more external devices included in the list, in the user equipment.

13. A method comprising:
collecting, by an enrollee, a site survey when a connection process starts;
parsing, by the enrollee, the site survey;
receiving, by the enrollee, a beacon including Wi-Fi simple configuration information from a register when the connection process starts;

finding, by the enrollee, the register by using the beacon;

sending a probe request packet to the found register;

receiving a probe response including the mesh ID from the register;

checking a mesh ID of the register received from the register;

determining whether the mesh ID includes a designated string; and when the register has the mesh ID, the mesh ID includes the designated string, and the register is manufactured by the same manufacturer of the enrollee,    generate a mesh ID and a mesh password and store configuration,    comparing the mesh ID and the mesh password of the enrollee and the mesh ID and the mesh password of the register by using MAC address of the register,    configuring a mesh network automatically depending on a connection process set by a manufacturer in advance, and    performing a rebooting, when the register does not include the mesh ID or the mesh ID does not include the designated string, configuring a network as an extender, when the manufacturer of the register is different from that of the enrollee,    configuring a network as a repeater, and    performing a rebooting, wherein the designated string includes information about a manufacturer set by the manufacturer of the external device.

14. The method of claim 13, wherein the register is included in a router and the enrollee is included in an extender.

\* \* \* \* \*